H. B. BISHOP.
METHOD AND APPARATUS FOR TESTING FLUIDS.
APPLICATION FILED SEPT. 5, 1907.
933,015.
Patented Aug. 31, 1909.
3 SHEETS—SHEET 2.
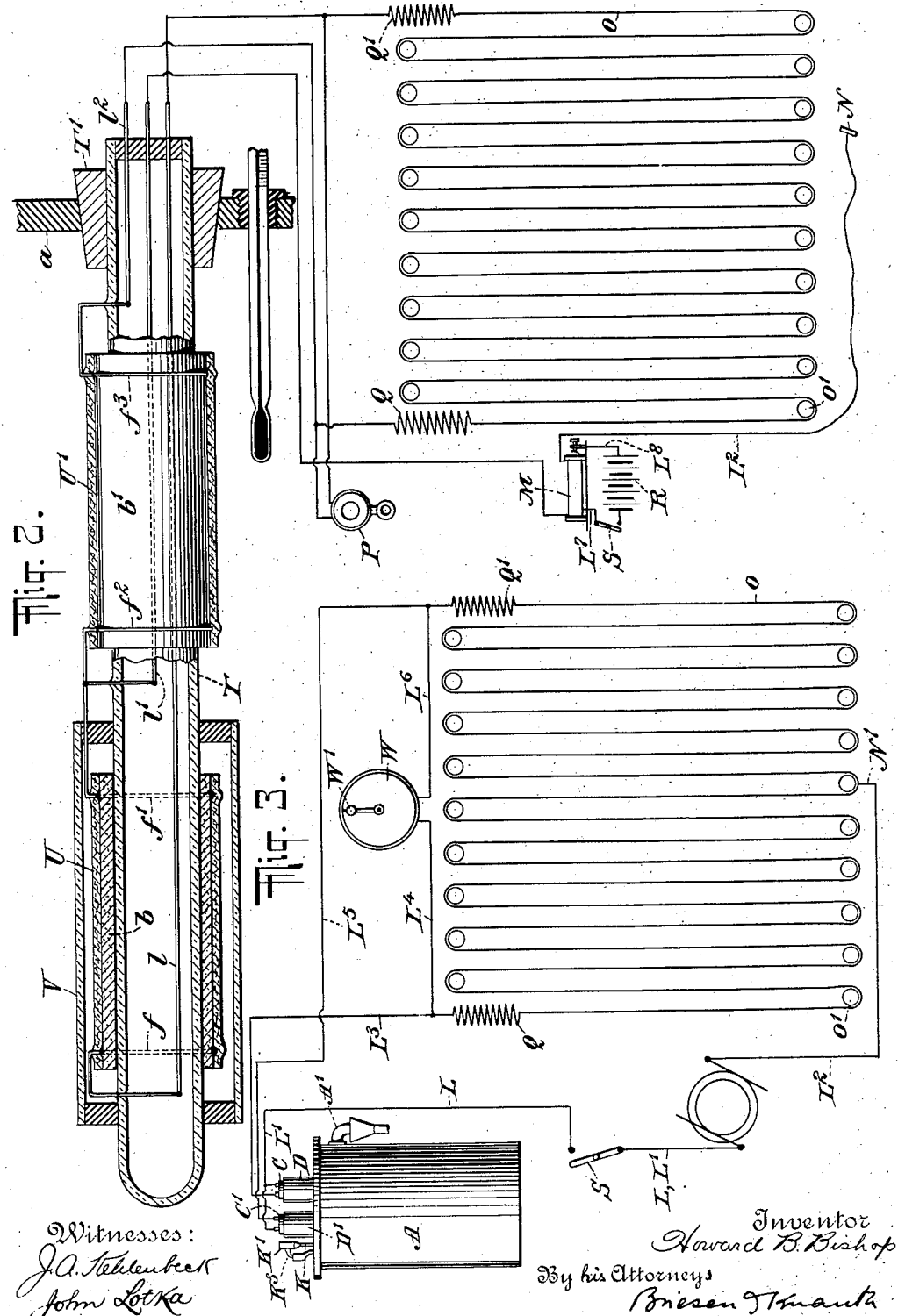
Witnesses:
J. A. Kehlenbeck
John Lotka
Inventor
Howard B. Bishop
By his Attorneys
Briesen & Knauth H. B. BISHOP.
METHOD AND APPARATUS FOR TESTING FLUIDS.
APPLICATION FILED SEPT. 5, 1907.

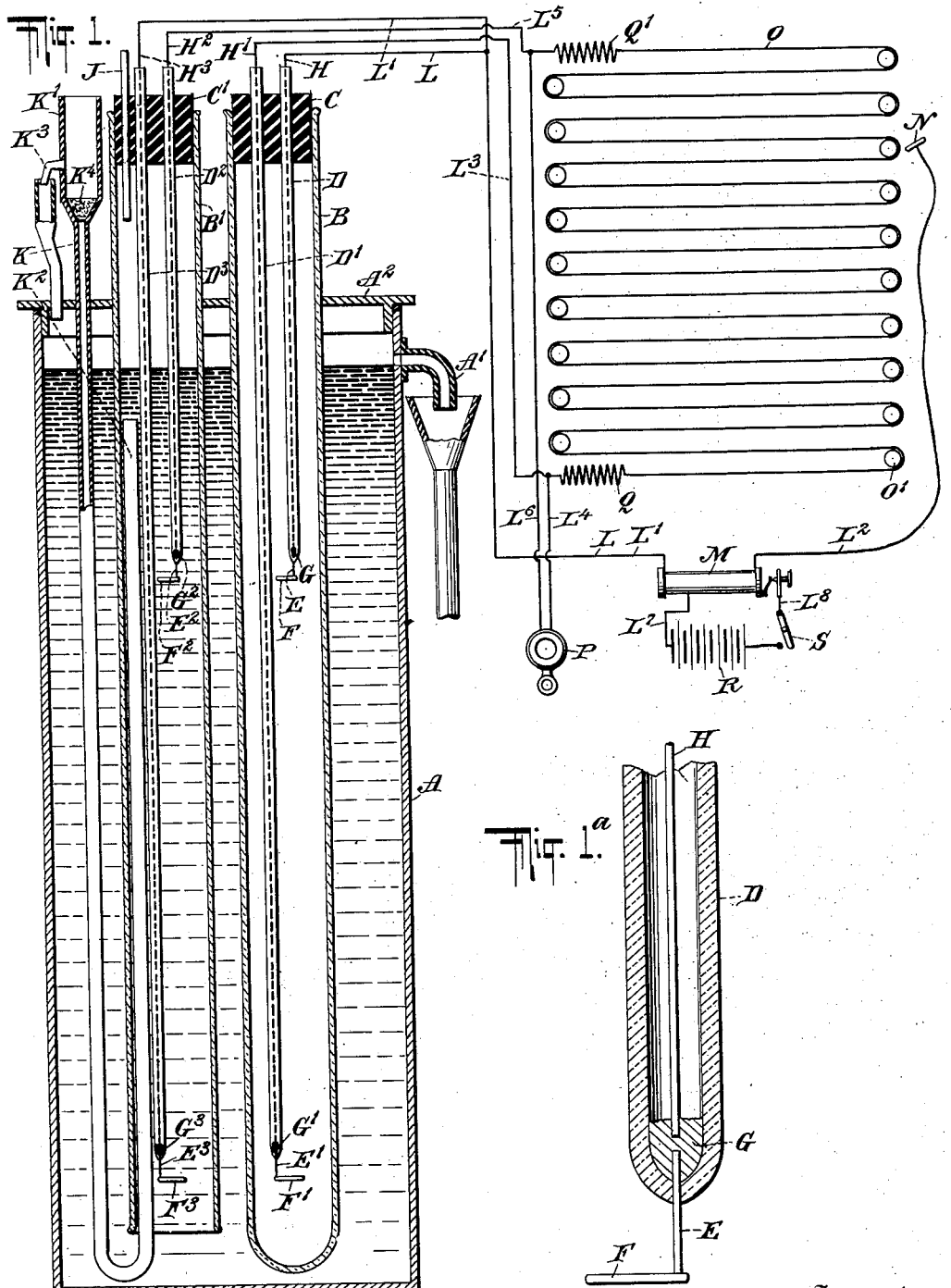

933,015.

Patented Aug. 31, 1909.
3 SHEETS—SHEET 3.

WITNESSES
John A. Kehlenbeck
John Lotka

INVENTOR
Howard B. Bishop
BY
Briesen & Knauth
ATTORNEYS

UNITED STATES PATENT OFFICE.

HOWARD B. BISHOP, OF NEW YORK, N. Y., ASSIGNOR TO GENERAL CHEMICAL COMPANY, OF NEW YORK, N. Y., A CORPORATION OF NEW YORK.

METHOD AND APPARATUS FOR TESTING FLUIDS.

933,015.   Specification of Letters Patent.   Patented Aug. 31, 1909.

Application filed September 5, 1907. Serial No. 391,416.

*To all whom it may concern:*

Be it known that I, HOWARD B. BISHOP, a citizen of the United States, resident of the borough of Brooklyn, county of Kings, city and State of New York, have invented certain new and useful Improvements in Methods and Apparatus for Testing Fluids, of which the following is a specification.

My invention relates to methods and apparatus for determining the condition of fluids, and particularly the strength or concentration of solutions, and the percentage of certain constituents contained in gaseous mixtures.

The principle on which my invention is based is that some properties, such as the electric conductivity, are affected by changes of concentration or, broadly speaking, of composition, and any variations of such property, (*e. g.* conductivity) can be observed or recorded.

The object of my invention is to provide a sensitive and reliable device of the above-indicated class, in which especial provision has been made for eliminating the disturbing influence of temperature variations. In its preferred forms, my invention enables the condition of the fluid under examination to be observed or recorded continuously, thereby affording valuable assistance in many industrial processes where it is desired to preserve a constant strength or composition, either of a final or intermediate product, or of one of the ingredients or media employed.

Figure 4:
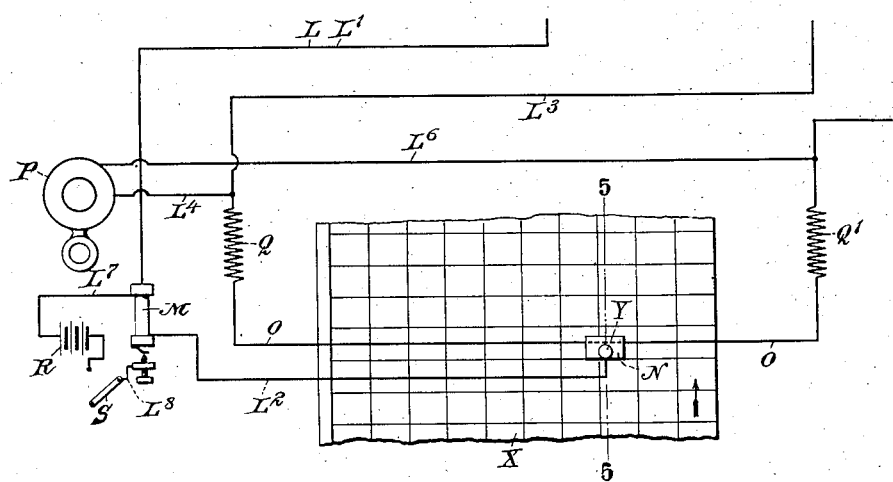
Figure 5:
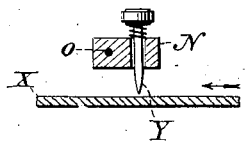

In the accompanying drawings, I have illustrated four typical forms of my invention, in diagrammatic fashion, Figure 1 showing an apparatus for determining the conductivity of liquids, such as sulfuric acid, and thus their strength or concentration, while Fig. 2 represents an apparatus for determining the condition of gases, and particularly the amount of moisture they carry; Fig. 1$^a$ is a detail vertical section of one of the electrodes of Fig. 1, with adjacent parts. Fig. 3 shows how the apparatus of Fig. 1 may be constructed as a recorder. Fig. 4 is a plan view of another form of recording apparatus embodying my invention and Fig. 5 is a partial vertical section on line 5—5 of Fig. 4.

In Fig. 1, A is a receptacle made of suitable material (preferably cast iron, if concentrated sulfuric acid is to be tested) and having an outlet or overflow at A'. Into the top or cover A$^2$ of said receptacle are fastened tubes B, B', made of glass or other suitable material, the tube B being closed at the bottom, while the tube B' is open at the bottom to the interior of the receptacle A. At the top of each of the tubes is a (rubber) stopper C, C' respectively. Through the stopper C extend (glass) tubes D, D', into the bottoms of which are sealed platinum wires E, E' connected with electrodes F, F' of like material. Of course other electrodes might be used. At the bottom, each of the tubes D, D' contains a globule of solder G, G' to effect a good electrical connection between the platinum wire E or E' and the copper wire H or H' respectively contained in the tube D or D'. In a similar way, two (glass) tubes D$^2$, D$^3$ extending through the (rubber) stopper C' contain copper wires H$^2$, H$^3$ connected by solder globules G$^2$ G$^3$ with the sealed-in platinum wires E$^2$ E$^3$ connected with the electrodes F$^2$, F$^3$. Preferably the resistance of the liquid between the electrodes F$^2$, F$^3$ should be about the same as that between the electrodes F, F' when the conductivity of the liquids in the tubes B, B' is the same. Through the stopper C' also projects a (capillary) vent tube J. A filling tube K, preferably provided with a funnel K' at its upper end, passes through the container cover A$^2$ and up through the bottom at the tube B' to the upper portion thereof preferably to a point above the electrode F$^2$. This tube comprises a narrow or contracted discharge portion K$^2$, and a by-pass K$^3$ leading from the widened or funnel portion K' directly to the container.

The adjustable electrical part of the apparatus is practically a Wheatstone bridge. The electrodes F, F$^3$ are both connected, as by wires, L, L', with the same pole of a source of electricity, in the present case the secondary winding of an induction coil M. The other terminal of the secondary is connected by a wire L$^2$ with a slide or movable connection N, which may be brought to different points of the bridge wire O. This wire, consisting of German silver or other suitable material, may be coated with vaseline to prevent corrosion, and strung tightly back and forth on porcelain insulators O' as shown. I desire it to be understood, however, that the bridge may be constructed differently. One end of the bridge wire is connected by a wire L³ with the electrode F' and by a wire L⁴ with one terminal of an indicator or recorder, such as a telephone P; the other end of the bridge wire is connected by a wire L⁵ with the electrode F² and by a wire L⁶ with the other terminal of the indicator P. Resistance spools Q, Q' are preferably located at the ends of the bridge wire.

R is a battery having its poles connected by wires L⁷, L⁸ with the primary of the induction coil M, the switch S serving to throw the electrical apparatus into or out of action.

The tube B is filled with a liquid of the same character as the one to be tested, for instance, sulfuric acid. It is not necessary that the strength of the sulfuric acid filled into the tube B should be known to the operator. The tube B' and receptacle or container A are then filled with sulfuric acid, the strength of which is determined independently by an analysis. The induction coil M being set in action, the operator listens at the telephone P and shifts the movable connection N along the bridge wire O until no noise is heard in the telephone. The bridge wire, or a scale adjacent thereto, is then marked at the point so found with the indication of acid strength obtained by the analysis. The tube B' and container A are then filled with sulfuric acid of a different strength (determined by analysis) and the corresponding point located and marked on the wire or scale in the same manner as described above. By a number of such procedures and subsequent interpolation, the wire or scale is "calibrated". The filling of the tube B and the calibration might be carried out by the manufacturer of the apparatus, if he knows what liquid is to be tested. In many cases however the purchaser and user of the apparatus will prefer to attend himself to the filling of the tube B and to the calibration. The tube B with the parts contained therein constitutes what I may term the "standard" section of the apparatus, inasmuch as the liquid contained therein is always the same, whereas the liquid in the "test" section, that is, the tube B' and its appurtenances, is of unknown and varying characteristics, and specifically concentration.

The apparatus having been prepared for use as above described the sulfuric acid to be tested is poured into the test section through the filling tube K. A continuous flow of acid may be employed if desired. The particular form of filling tube has been adopted to facilitate such continuous flow. Since part of the electrical current passes from the electrode F² through this filling tube K, and the iron container A to the electrode F³, it is desirable that the diameter of the discharge portion K², should be small so as to increase its electrical resistance and decrease the electrical current through this shunt circuit. It being difficult to regulate a small stream of acid, a larger stream than required by the tube K², is used, and the excess overflows at K³, into the container A and both portions of the liquid under examination pass out together at the overflow A'. The bottom of the funnel tube K' is filled with a layer of glass wool K⁴ to filter out any insoluble matter that would clog the tube K, K². The stopper C' should preferably be located at such a distance from the upper electrode F² that the heat of the acid in the test section will not injuriously affect the rubber or other sealing material used for the stopper C'.

Whether a continuous flow is employed, or whether the liquid to be tested is simply admitted from time to time, the determination of its strength is effected by simply setting the induction coil in action, shifting the movable member N until no sound is heard in the telephone, and reading off the strength on the scale.

A very important feature of my invention (in every one of its forms here illustrated) is that the fluid under examination exerts a thermic influence on both the standard section and on the test section, thus equalizing variations of temperature and avoiding their disturbing influence. The test section alone is exposed to the influence of variations in the composition of the fluid under examination, while the standard section, being closed against the entrance of such fluid, (while under its thermic influence), is shut off or excluded from the influence of variations in the composition of the fluid being tested. In other words variations of that feature (such as conductivity) which is really determined in the apparatus, will affect only the test section, but not the standard section.

In Fig. 2, I have shown a form of my apparatus particularly adapted for testing gases, and especially with reference to their degree of moisture. $a$ indicates the container, in this case a pipe or flue, through which the gas (such as sulfurous acid) to be tested, is passed. Into this container projects a (glass tube T held by means of a stopper or plug T' and serving as a carrier for the standard section and the test section of the apparatus. This standard section as shown comprises an unglazed porcelain tube $b$ near the ends of which are platinum electrodes $f\ f'$ in the nature of fine surrounding wires. These wires are in contact with a wrapper U of asbestos or other suitable retaining material. The electrode wire $f$ is soldered to the insulated copper wire $l$, and fused into the tube T. The tube $b$ with the asbestos wrapper U is moistened with commercially pure sulfuric acid say of 93% preferably by allowing the acid to flow over the tube, and to drain while the latter is in a horizontal position in a closed tube. Then the tube $b$ is inclosed in the glass tube V, stoppered at each end, and sealed with sulfur or otherwise. The gas under examination can not therefore come in contact with the acid in the standard section, although such acid is exposed to the thermic influence of the said gas.

The gas has direct access to the test section, which comprises a tube $b'$ (say of unglazed porcelain) with platinum wire electrodes $f^2$, $f^3$ and an asbestos wrapping U' of the same character as above referred to, and moistened with concentrated sulfuric acid. The electrodes $f'$, $f^2$ are welded together, fused into the tube T and soldered to the insulated copper wire $l'$. The electrode wire $f^3$ is likewise fused into the tube T, and soldered to the insulated copper wire $l^2$. As the right hand end of the tube T is closed, the wires $l$, $l'$ $l^2$ are protected against attack by the gas under examination.

It will be understood that both in the standard section and in the test section a thin film of acid remains on the tube between the electrodes. The conductivity of the film in the standard section is not affected by changes in the composition or specifically the degree of moisture, of the gas under examination. The thermic influence of such gas is exerted alike on the two sections of the apparatus. The two sections having been moistened and prepared for use as described, the tube or carrier T is secured within the pipe or container A, and the wires $l$, $l'$, $l^2$ connected with the electric determining apparatus, which is practically the same as in Fig. 1, and therefore need not be described again.

The apparatus is first calibrated or standardized by passing gas through the pipe A, shifting the movable connection N on the wire O until no sound is heard in the telephone P, and marking on the scale at that point, the corresponding degree of moisture determined by any approved method. By marking a series of points in this manner, and suitable interpolating, the apparatus is standardized. The temperature should however be noted by means of a thermometer placed in the pipe A. This determination is based on the fact that for every percentage of moisture in a gas at a given temperature there is a corresponding percentage of sulfuric acid that will be in equilibrium with that gas, that is, the acid will neither be concentrated nor weakened by passing the gas over it. But with an increase or decrease in temperature there will be a corresponding concentrating or weakening of the acid, so that it is necessary to refer to a table of vapor tensions of sulfuric acid at varying temperatures and concentrations.

The apparatus having been standardized the degree of moisture of the gas can be determined instantly at any time by closing the switch S and shifting the connection N until no noise is heard in the telephone. The operator will then read off the temperature on the thermometer and the indication on the scale adjacent to the wire O, and by referring to a table will determine the degree of moisture of the gases, expressed in any desired unit, as milligrams of moisture per cubic foot of gas.

Wherever it is desired to test a fluid (liquid or gaseous) as to properties which affect its electrical conductivity, or the electrical conductivity of a testing fluid, the particular electric apparatus described above may be used. It may be that in some cases the connection N may be moved over a long stretch of wire O without causing an audible sound in the telephone P; in such cases the corresponding graduation mark would be applied at the center of such wire portion.

I desire to be clearly understood however that the electric determination of varying conditions of fluids is but one way of availing oneself of the advantages of my invention.

The two apparatus hereinbefore described are operated on the principle of acoustic observation, but no record is made of such observations. Various ways might be adopted for obtaining a record, either intermittent or continuous. An intermittent record might be secured by the simple addition of a record sheet X (Figs. 4 and 5) of the usual character moved by clockwork, (not shown) adjacent to the wire O (suitably arranged with reference to the direction in which the sheet moves, that is, preferably straight and at a right angle to the sheet's movement). Every time the operator makes a determination, he might put a mark on the record sheet, as by pressing a point or stylus Y connected with the slide or movable member N.

As indicated in Fig. 3, a source of alternating current having a constant average voltage might be connected with the wire L, L' and the wire $L^2$ respectively, the connection N' permanently fixed at a certain point, and an alternating-current galvanometer W substituted for the telephone P. The deflection of the galvanometer, measured on a scale suitably standardized, would give the desired indication, or a continuous record could be obtained by securing a small mirror W' to the galvanometer needle, and causing it to reflect a beam of light on a sensitized strip of paper moved by clockwork, so that a photographic record would be produced. The use of alternating currents is preferred because I thus avoid the disturbing influence of polarization. However, in some cases it might be convenient to substitute a battery or other source of continuous current for the source of alternating current, in which case an ordinary galvanometer would be used instead of the alternating current galvanometer W.

I desire it to be clearly understood that while at present I prefer to determine the conductivity of the fluid under examination, other expedients may be adopted for this purpose. An important feature of my process is that the fluid under examination does itself equalize the temperature of the standard and test sections of the apparatus, by exerting a thermic influence on both, but has no access to the fluid in the standard section.

I claim:—

1. An apparatus for testing fluids, which comprises a standard section and a test section, each electrically conductive, a container in which both sections are arranged and exposed to the heating or cooling action of the fluid being tested, the standard section being closed against the entrance of said fluid, while the test section is open thereto, and electrical apparatus for observing differences in conductivity between the standard section and the test section.

2. An apparatus for testing fluids, which comprises a standard section, adapted to contain a body of standard conducting liquid, a test section also electrically conductive under conditions of use, means for exposing both sections to the thermic influence of the fluid under examination and for exposing the test section to the conductivity-varying action of the said fluid, and electrical apparatus for observing differences in conductivity between the standard section and the test section.

3. An apparatus for testing fluids, which comprises a standard section and a test section both electrically conductive under conditions of use, a container in which both of said sections are arranged and through which the fluid being tested is caused to flow to exert a similar thermic influence on both sections, the test section being also exposed to the conductivity-varying action of the fluid under test, and electrical apparatus for observing differences in conductivity between the standard section and the test section.

4. An apparatus for testing fluids, which comprises a standard section and a test section, a container in which both of said sections are arranged and through which the fluid being tested is caused to flow, the standard section being excluded from the direct action of the said fluid while the test section is exposed to such direct action, and both sections being exposed equally to the thermic influence of the fluid under test, and means for observing differences in condition between the standard section and the test section.

5. An apparatus for testing fluids, which comprises a standard section and a test section, a container in which both sections are immersed and to which the test section is open and the standard section closed so that the fluid under test will have access to the interior of the test section but not to the interior of the standard section, and means for observing differences in condition between the standard section and the test section.

6. An apparatus for testing fluids, which comprises a standard section and a test section, means for exposing both sections equally to the thermic action of the fluid under examination and for shutting out the standard section from other influences of the said fluid while the test section is fully exposed to the influence of said fluid, and means for observing differences in condition between the standard section and the test section.

7. An apparatus for testing fluids, which comprises a standard section and a test section, means for exposing both sections to the thermic action of the fluid under examination and for shutting out the standard section from other influences of the said fluid while the test section is fully exposed to the influence of said fluid, an electric circuit having two branches, one including the test section and the other the standard section, and means for observing the relative strength of current flowing through said branches.

8. An apparatus for testing fluids, which comprises a standard section and a test section, means for exposing both sections to the thermic action of the fluid under examination and for shutting out the standard section from other influences of the said fluid while the test section is fully exposed to the influence of said fluid, an electric circuit having two branches, one including the test section and the other the standard section, means for varying the current flowing through said branches, and means for observing the relative strength of current flowing through said branches.

9. An apparatus for testing fluids, which comprises a standard section and a test section, means for exposing both sections to the thermic action of the fluid under examination and for shutting out the standard section from other influences of the said fluid while the test section is fully exposed to the influence of said fluid, an electric circuit having two branches, one including the test section and the other the standard section, a resistance in circuit with said branches, a source of electricity, a movable member for variably proportioning the amount of current passing from said source through said resistance to each of said branches, and means for observing the relative strength of current flowing through said branches.

10. An apparatus for testing fluids, which comprises a standard section and a test section, means for exposing both sections to the thermic action of the fluid under examination and for shutting out the standard section from other influences of the said fluid while the test section is fully exposed to the influence of said fluid, an electric circuit having two branches, one including the test section and the other the standard section, a resistance in series with said branches, an induction coil the secondary winding of which has one terminal connected with one end of each branch, a movable member connected with the other terminal and arranged to variably proportion the amount of resistance in series with each of said sections, and a telephone receiver in shunt relation to said resistance.

11. An apparatus for testing fluids, which comprises a standard section adapted to contain a separate body of standard fluid, and a test section, means for exposing both sections equally to the thermic influence of the fluid under examination and for exposing only the test section to the influence of the varying feature to be determined while shutting out the fluid in the standard section from such influence, and means for observing differences in condition between the standard section and the test section.

12. An apparatus for testing fluids, which comprises a standard section and a test section, means for exposing both sections equally to the thermic influence of the fluid under examination, and for exposing the test section to the influence of variations in the composition of the fluid under examination while shutting out the standard section from such influence, and means for observing differences in condition between the standard section and the test section.

13. An apparatus for testing liquids, which comprises a closed tubular standard section and an open tubular test section, a container in which both sections are arranged and with which the test section communicates, electrodes located within said sections, means for introducing the liquid under examination into the container and the test section, and electrical apparatus for observing differences in conductivity between the standard section and the test section.

14. An apparatus for testing fluids, which comprises a container for the fluid under test, a standard section and a test section immersed in said container so that both sections will be surrounded by the fluid under test and exposed equally to its thermic influence, the test section being open to the container and the standard section closed thereto, so that the fluid under test will have access to the interior of the test section but not to the interior of the standard section, and means for observing differences in condition between the standard section and the test section.

15. An apparatus for testing fluids, which comprises a standard section and a test section, means for exposing both sections to the thermic action of the fluid under examination and for shutting out the standard section from other influences of the said fluid while the test section is fully exposed to the influence of said fluid, and a device for recording variations in the condition of the fluid under examination in the test section.

16. An apparatus for testing liquids, which comprises a closed tubular standard section and an open tubular test section, a container in which both sections are arranged and with which the test section communicates, electrodes located within said sections, a supply device having two branches, one arranged to discharge a portion of the liquid under examination direct into the test section, and the other arranged to discharge the remainder of such liquid into the said container, and electrical apparatus for observing differences in conductivity between the standard section and the test section.

17. The method of testing fluids, which consists in inclosing a body of standard liquid, providing an exposed testing body of the same liquid, subjecting both bodies to the thermic action of the fluid under examination, and the testing body to direct contact with such fluid, and observing differences in condition between the standard body and the testing body.

18. The method of testing fluids, which consists in inclosing a body of standard liquid, providing an exposed testing body of the same liquid, subjecting both bodies to the thermic action of the fluid under examination, and the testing body to direct contact with such fluid, and observing differences in electrical conductivity between the standard body and the testing body.

In testimony whereof, I have hereunto set my hand in the presence of two subscribing witnesses, this 30th day of August, A. D. 1907.

HOWARD B. BISHOP.

Witnesses:
JOHN LOTKA,
EUGENE EBLE.